Nov. 19, 1957  A. C. PAWELA  2,813,722
FERTILIZER DISTRIBUTOR
Filed May 9, 1955  3 Sheets-Sheet 3
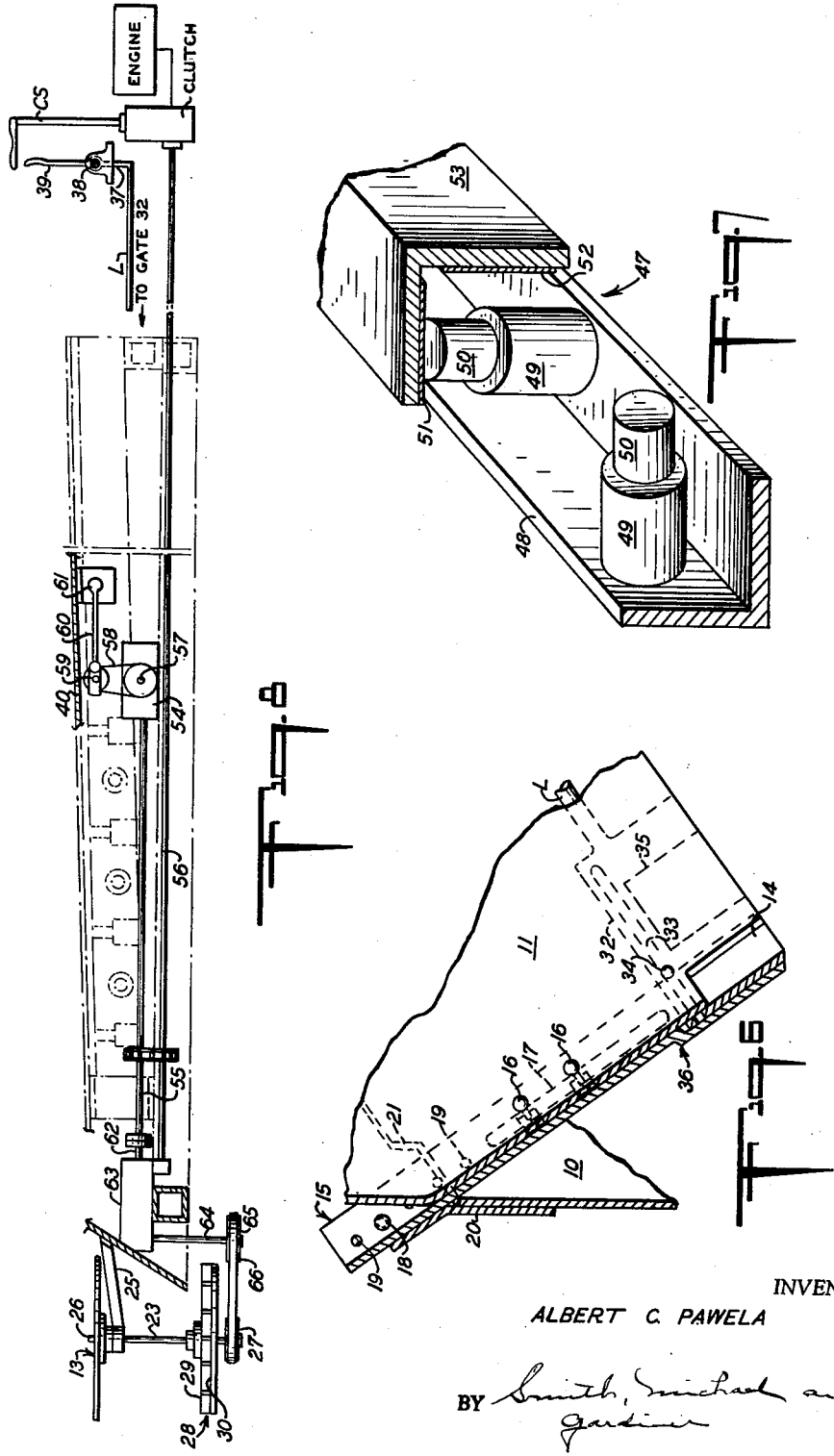
INVENTOR
ALBERT C. PAWELA
BY
ATTORNEY

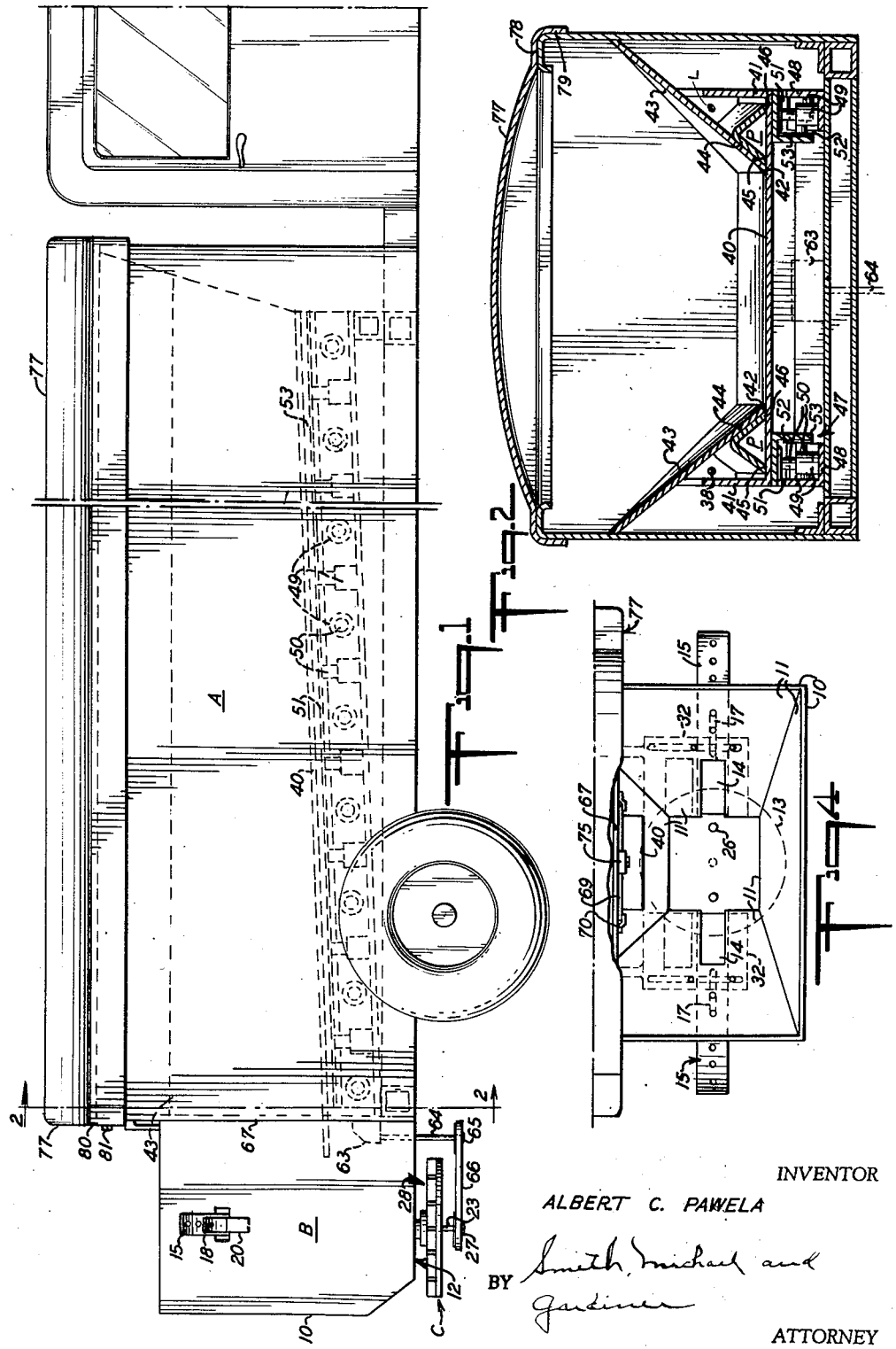

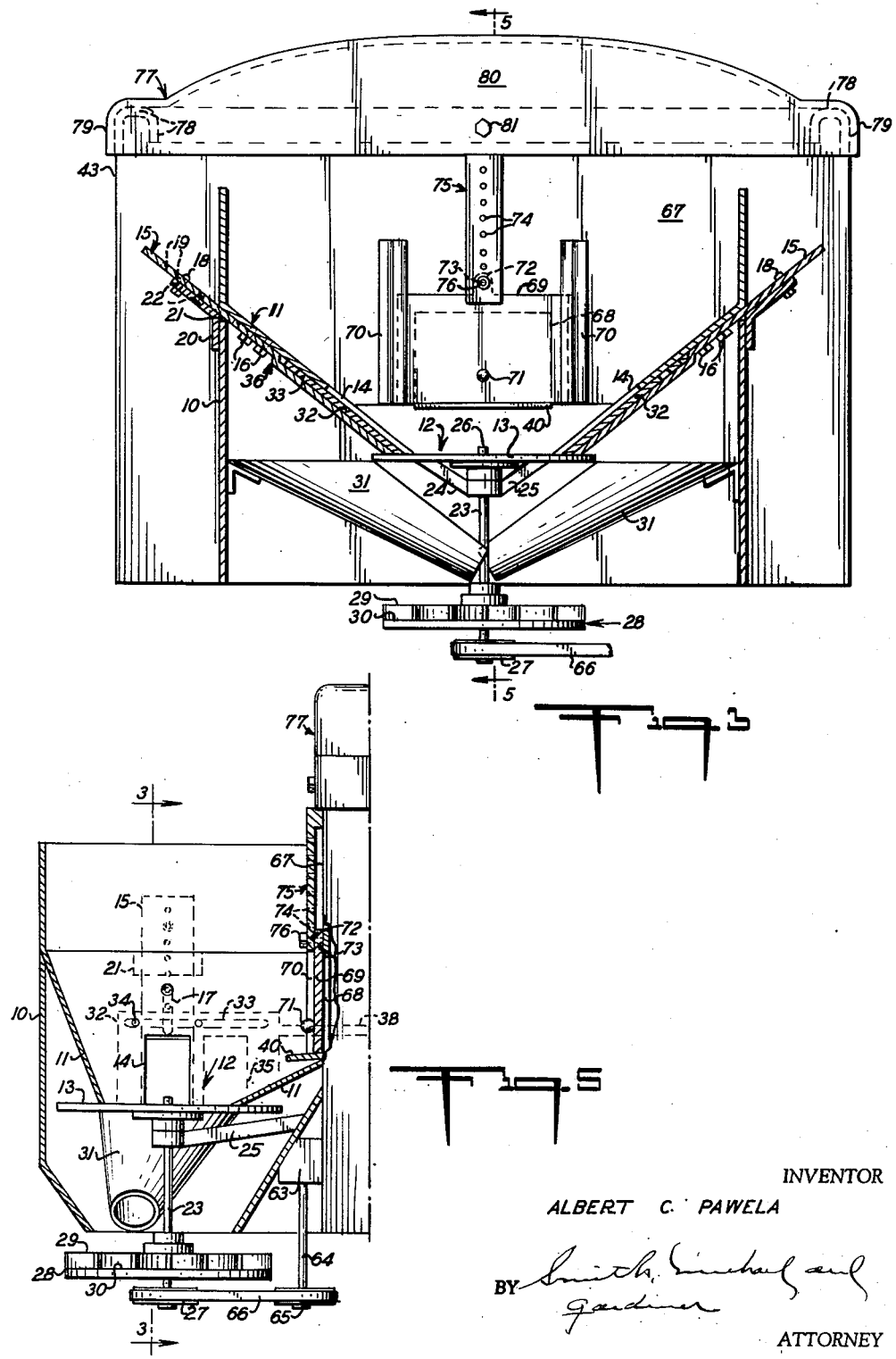

United States Patent Office 2,813,722
Patented Nov. 19, 1957

2,813,722
FERTILIZER DISTRIBUTOR

Albert C. Pawela, Winter Haven, Fla.

Application May 9, 1955, Serial No. 507,022

14 Claims. (Cl. 275—8)

This invention is a distributor for dry powdered or granular material and designed particularly for applying lime or fertilizer to land on farms and in groves or orchards.

The distributor of the present invention is designed to be mounted upon a power-driven vehicle such as an automotive truck or tractor, and includes power-driven feed and spreader mechanism powered from the engine of the truck. While distributors of this general character have been proposed heretofore, these known machines have certain objectionable features which the distributor of the present invention seeks to avoid.

One object of the invention is to provide a distributor of the character described which includes a main supply hopper for the material to be distributed together with non-positive feed means for delivering said material to the distributor or spreading mechanism in a self-compensating manner.

Another object of the invention is to provide within the main hopper a reciprocating plate feeder having novel edge sealing means to minimize the waste or spillage of material from the hopper.

Another object of the invention is to provide an auxiliary hopper into which the material from the main hopper is fed and to provide within said auxiliary hopper, a non-positive centrifugally operable feed means for delivering the material through metering means to a throwing disk or centrifugal spreader means.

Another object of the invention is to provide novel material cut-off means between a feed means in the auxiliary hopper and the centrifugal spreader means together with control means therefor operable from the driver's compartment or cab of the truck to which the apparatus as a whole is attached.

Another object of the invention is to provide an apparatus of the character described which is adjustable to distribute dry powdered or granular material such as lime, fertilizer or sand, evenly over farm, grove or orchard land in any desired amount within practical limits, such as between 50 pounds and 8000 pounds per acre, and which will operate to distribute such material uniformly without regard to rolling contours of the land over which the apparatus is being operated.

Another object of the invention is to provide a distributing apparatus of the character described which is simple in construction and which is accurate and uniform in operation.

These and other objects of the invention will become apparent from the following specification when read in the light of the accompanying drawings in which:

Fig. 1 is a side elevation of the invention with parts broken away;

Fig. 2 is a transverse sectional view taken on the line 2—2 of Fig. 1;

Fig. 3 is a rear elevation of the auxiliary hopper with the rear wall thereof broken away;

Fig. 4 is a top plan view of the auxiliary hopper with parts broken away;

Fig. 5 is a side elevation of the auxiliary hopper with parts broken away;

Fig. 6 is a detailed sectional view of the adjustment and cut-off plates for the auxiliary hopper;

Fig. 7 is a detailed perspective view of the bearing blocks for the reciprocating plate conveyor;

Fig. 8 is a side elevation, in perspective, of power means for driving the feed plate and disks.

In the accompanying drawings, wherein I have illustrated a preferred form of the invention and wherein like reference numerals are used to designate like parts throughout, Fig. 1 shows a more or less diagrammatic side elevation of my invention including the main supply hopper A mounted upon an automotive truck chassis and the auxiliary hopper B mounted upon the rear end wall or tailgate thereof. Below the auxiliary hopper B is disposed the centrifugal throwing or spreading disk C.

The auxiliary hopper B comprises vertical side walls 10 and bottom walls 11. The latter taper inwardly and downwardly to form a hopper, generally in the form of an inverted pyramid. The apex of the pyramid is cut away on a plane generally perpendicular to the axis thereof. This provides an opening 12 in the hopper bottom; which is closed from beneath by a circular feeder disk 13 mounted for rotation in a substantially horizontal plane and in juxtaposed relation to the edges of the walls 11 defining the opening 12 whereby to preclude loss of material from the hopper B by passing between the disk 13 and the hopper walls 11. The arrangement of the disk 13 with respect to the opening 12 is best shown in Fig. 3 wherein the upper surface of the disk 13 is shown in close proximity to the lower edges of the inclined bottom walls 11, it being noted that the opening 12 is less in transverse dimension than the disk 13, so as to provide a desired degree of overlap between the disk and the lower edges of the hopper walls to thereby effectively seal the disk to the hopper.

The inclined bottom walls 11 on opposite sides of the longitudinal central line of the apparatus as viewed in Fig. 3 are each provided with an opening or notch 14 in the lower portion thereof adjacent to the surface of the disk 13, said notches 14 being disposed at generally diametrically opposite points with respect to the disk. These openings 14 provide exit openings for the material projected from the disk 13 when rotated, in a manner to be hereinafter described.

I provide means for selectively controlling the effective discharge area of said exit openings 14, said means being in the form of slidable plates 15 mounted upon the outer face of the sloping walls 11 in any convenient manner, such as by the bolts 16 and slots 17 as shown in Fig. 5. By adjusting the plates 15 lengthwise, the effective cross-sectional area of the openings 14 may be controlled to determine the amount of material being discharged from the hopper B by the disk 13. The plates 15 may be retained in adjustable position by means of pins 18 which may be placed in any desired one of a longitudinal series of holes 19 provided in the plates 15. The pins 18 when so placed may engage the outer surface of the walls 10 to prevent downward or closing movement of the plates or if desired, auxiliary locking plates 20 may be secured to the walls 10 below the slots 21 provided in said walls and through which the upper end of the plates 15 project, the plates 20 each being provided with an aperture 22 for receiving the pin 18, as shown in Fig. 5.

The feeder disk 13 is secured to the upper end of a shaft 23 mounted for rotation about a substantially vertical axis by any suitable means. If desired, struts or bracket members 24 and 25 may be provided which are connected to any suitable part of the truck chassis. The disk 13 is provided with one or more upstanding pins or lugs 26 to assist in constantly agitating the material and in breaking up any lumps of material within the hopper B to thereby maintain a free flow of material from the hopper B through openings 14. The shaft 23 may be provided with a drive pulley 27 by which the shaft and disk are driven from the power plant of the truck in any convenient manner as will be hereinafter described.

The shaft 23 carries a centrifugal throwing disk 28 at an appropriate distance below the feeder disk 13, said disk 28 being provided with throwing vanes 29 upstanding from the upper surface 30 thereof and extending generally radially of the disk. The material projected through the openings 14 in the walls of the hopper B by the disk 13 falls into the open upper ends of tubular chute members 31 disposed outwardly of the periphery of the disk 13 and in substantial alignment with the openings 14. The chutes 31 are generally tapered in cross-sectional area, being larger in diameter at the upper or receiving ends thereof and are disposed with their lower end in close proximity to the center of the throwing disk 28 as clearly shown in Fig. 3. By this means, the material discharged from the hopper B is caught by the chutes 31 and delivered onto the surface of the throwing disk 28 from which said material is discharged uniformly upon the land over which the apparatus is being operated.

I provide movable closure means in association with the discharge openings 14 of the hopper for opening or closing said openings independently of the plates 15. This is desirable whenever it is necessary to close such openings without disturbing the adjustment of the plates 15, such as when the apparatus is being turned around at the end of a lateral run through a farm or grove. To this end I provide slidable cut-off plates 32, one for each opening 14. In Fig. 5 one such plate 32 is shown mounted for sliding movement on the outside surface of the wall 11 in overlapping relation to the aperture 14 and is guided for sliding movement by the slot and pin connections 33 and 34. The plate 32 is provided with an aperture 35 corresponding in size to the aperture 14 and positioned so that when the plate 32 is in the extreme left-hand position as viewed in Fig. 5, said opening 35 will coincide with the opening 14 and when the plate is in the position shown, the openings 14 and 35 are out of registration and the opening 14 is closed. It is to be noted that the plate 32 is shown mounted to slide between the outer surface of the wall 11 and the adjustment plate 15 and if desired the plate 15 may be off-set as shown at 36 to accommodate the plate 32 while permitting the upper portion of the plate 15 to lie substantially flush with the outer surface of the wall 11. Any convenient means such as the link L (Fig. 8) may be provided for manipulating the slide plate 32 from open to closed positions, said link being operatively connected to an arm 37 carried by a cross shaft 38 to which is connected an operating lever 39 located adjacent to the operator's position or the cab of the truck. While I have shown in detail only one of the plates 32, it will be understood that a similar plate 32 is provided in connection with the opening 14 in the opposite wall 11 of the hopper B, the same being similarly mounted and provided with a control link as described. Conveniently, the cross shaft 38 may carry a second arm to which the control linkage of the second plate 32 may be connected.

As previously mentioned, the present invention contemplates providing non-positive feed means in connection with the main hopper A to supply material therefrom to the auxiliary hopper B. To this end, the main hopper A is provided with a botttom plate 40 mounted therein for longitudinal reciprocation. The plate 40 constitutes the bottom of the hopper A and a closure plate for elongated bottom opening in the hopper body. The plate 40 is provided with an upturned flange 41 at each longitudinal edge thereof and receives within said spaced flanges 41, the longitudinally extending lower edges 42 of the hopper body side walls 43. The outer face of each wall 43 has secured thereto adjacent to the edge 42 thereof means to provide a downwardly open sealing groove. Thus, an inverted angle member 44 may be secured to the lower edge of each wall 43 in a manner such that the edges 45 and 46 of the angle member 44 and the edges 42 of the walls 43 lie in a substantially common plane and constitute a bearing and/or sealing surface for the reciprocating plate 40. The plate 40 is supported upon a frame indicated generally at 47 and it may be supplemental to or a part of the truck chassis. The frame 47 includes longitudinally extending angle members 48 having secured thereto the spaced points throughout the length thereof, as by welding, cylindrical pocket members 49, alternate pocket members being disposed respectively on horizontal and on vertical axes as shown in Fig. 7. The pocket-forming members 49 may be short sections of pipe or cylinder tubing and in each such pocket is fixedly mounted a bearing block 50 of wood or similar material. Preferably the bearing blocks 50 are in the form of wooden plugs which may have been treated to make them wear-resistant and these plugs are fitted tightly within the pockets 49, with the end of the grain exposed at the bearing ends thereof. The plate 40 is provided with bearing surfaces to cooperate with the bearing blocks 50, such bearing surfaces being shown at 51 and 52 and comprising strips of stainless steel secured, as by welding, to the inner surfaces of inverted angle members 53 carried by the undersurface of the plate 40 adjacent the longitudinal edges thereof. The bearing blocks 50 disposed on the horizontal axis thus engage the bearing strips 52 which lie in a substantially vertical plane and the bearing blocks 50 which are disposed in vertical axes engage the strips 51 which lie in substantially horizontal planes so that when the plate 40 is reciprocated longitudinally by means hereinafter described, the weight of material within the hopper A is taken by the vertically disposed blocks 50 and the horizontally disposed blocks 50 restrain the plate against undue lateral displacement.

It should be noted that the joint between the hopper walls 43 and the plate 40 is effectively sealed against loss of material from the hopper by the pocket formed between the downturned angle members 44 and the underlying surface of the plate 40. Due to operation of the plate 40 finely divided material from the hopper A will work under the edge 42 and become entrapped within the pocket P and as this material becomes packed therein, such material functions to substantially preclude the entrance thereinto of any further quantity of the material from the hopper. If desired the pocket P may be coated or packed with heavy grease and this has been found to enhance the sealing action as well as to lubricate the contacting edges 42 of the wall 43 and plate 40. As shown in Fig. 2, the overall width of the plate 40 between the flanges 41 is slightly greater than the distance between the outside edges of the angle members 44. This feature precludes any binding action between the parts when in operation.

Any convenient means may be employed for driving the plate 40 and I have shown in Fig. 8, more or less diagrammatically, one mechanism for this purpose. Mounted in any convenient manner upon the truck chassis and beneath the hopper A is a gear box 54, the input shaft 55 thereof being geared to a shaft 56 which in turn is driven from a clutch controlled power takeoff operatively connected to the truck power plant. The gear box 54 is designed to drive at proper speed, a shaft 57 which by means such as a sprocket chain or belt 58, drives a crankshaft 59 to actuate a pitman 60 connected in conventional manner to a socket member 61 attached to the underface of the plate 40. The shaft 55 may be coupled to the input shaft 62 of a gear box 63 which provides a proper speed for the shaft 64, carrying pulley 65 disposed with reference to the pulley 27 on shaft 23 so that the latter may be driven by a belt 66. Any convenient means such as the clutch shifter CS may be provided, whereby the driver may control operation of the shaft 56 from the driver's seat to render the same operative or inoperative as desired.

As shown in Fig. 1 the plate 40 may be mounted in a manner to have a slight rearward and downward inclination if desired. This enhances the feeding action of the plate when in operation.

The rear wall 67 of the hopper is provided with an opening 68 beneath which plate 40 extends and through which material from the hopper A is discharged into the auxiliary hopper B. The opening 68 is controlled by a vertically sliding gate 69 mounted on the rear wall 67 as shown in Fig. 3. Thus, the gate 69 may be guided by flanges 70 within which the gate is slidably mounted and any suitable operating mechanism may be employed, such as the handle 71 mounted on said gate, for raising and lowering the gate. A lug 72 carried by the upper end of the gate is provided with an aperture 73 designed to cooperate with any one of a series of vertically arranged locking apertures 74 in a plate 75 secured to the wall 67 in a manner to permit the gate 69 and lug 72 to pass thereunder whenever the gate is raised so that a locking bolt 76 may be passed through the hole 73 and one of the holes 74 to thereby secure the gate in any desired raised position.

If desired, the truck body or hopper A may be provided with a removable cover 77 to protect the contents of the hopper from the weather. Thus, the upper edges of the hopper walls 43 may be provided with flanges 78 to slidingly support the cover 77, the latter having a downturned flange 79 designed to receive the hopper walls 43 therebetween. If desired, the cover 77 may carry depending flange 80 at its rear edge to provide means whereby a bolt 81 may be passed thereinto and screwed into a cooperating aperture in the truck body.

Having thus described the invention, the operation of my apparatus will be readily understood. Having placed in the hopper A a desired quantity of material such as powdered lime or fertilizer to be distributed, the gate 69 is raised to any desired amount and secured in such position between bolt 76. The adjustable slide plates 15 are then raised to provide the proper degree of opening for the openings 14 to insure distribution of material by the thrower plate 28 in a desired amount as for instance a certain number of pounds of material per acre. Assuming the machine is located where it is desired to apply the material, the cut-off plates 32 may be opened by the control means 39 and the engine of the truck started and the clutch control actuated to drive the shaft 57. The plate 40 is thus put into operation to feed material from the hopper A to the hopper B and the feeder disk 13 is now rotating at high speed to throw material from the hopper B outwardly through openings 14 into chutes 31 for delivering to the throwing disk 28 so that as the truck is driven into the farm or orchard, said material is uniformly scattered on both sides of the machine.

It is important to note that in operation, the reciprocating plate feeder 40 is self-compensating and is normally driven at a speed to feed more material to the hopper B than is to be metered therefrom through controlled openings 14. Thus, as material accumulates in hopper B to a point above the discharge end of plate 40, and above opening 68 in the rear wall of the hopper A, the plate 40, although continuing to operate at the same speed, automatically reduces its rate of feed of material and may even stop feeding entirely when the material in the hopper B reaches a given height. To realize this relationship, the discharge end of plate 40 enters the auxiliary hopper B above the disk 13 but well below the top of the hopper B so that the discharge end of the plate 40 may at times become completely submerged in the material accumulating in hopper B. This is an important advantage since the feed from the bulk hopper A is thus rendered self-compensating and precludes entirely all danger of jamming or choking of the apparatus as sometimes occurs in apparatus where a positive feed means is employed to deliver material to an auxiliary hopper.

Another important advantage of the present apparatus is that due to the position of the control means 39 and the clutch operator CS, the operator has at his command full control over the areas to be treated and this without moving from his operator's seat or truck cab. In this connection it should be noted that while I have shown the two cut-off plates 32 connected to be simultaneously operated by the lever 39, I may, if desired, duplicate the lever 39 and its cross shaft 38 and connect the operating link for one of the cut-off plates thereto in the manner previously described so that the cut-off plates 32 may be individually and selectively controlled.

Furthermore, the feeder disk 13 in the auxiliary hopper B provides a continuous and forceful projection of material through the openings 14 at all times. This insures a substantially uniform distribution of material by the machine in spite of rolling contours in the areas being treated. Also due to the high speed of the disk 13 and the pins 26 carried thereby the material within the auxiliary hopper B is maintained in a constant state of agitation which insures a uniform mixing of all ingredients comprising the material being applied.

The novel arrangement of mounting the reciprocating plate feeder so as to close the bottom opening of the truck body provides a simple and economical design for the hopper and an effective seal for the joint between the plate and the hopper, while the dual sets of wooden bearing blocks (vertical and horizontal) may be replaced when necessary at a fraction of the cost of steel balls or rollers. Also, by arranging the plate to be reciprocated longitudinally of the main hopper and generally in line with the direction of operation of the vehicle, the flow of material from the main hopper to the auxiliary hopper is substantially unaffected by the tilt of the hoppers due to the rolling contours of the terrain.

Having thus described my invention, it will be appreciated by those skilled in the art that various changes may be made in the size and proportion of parts within my apparatus without departing from the spirit of invention which is defined more clearly in the appended claims.

What I claim is:

1. In a material distributor, the combination with a supply hopper, an auxiliary hopper, material distributing means, and means for removing material from the auxiliary hopper and delivering the same to the material distributing means, of self-compensating feeder means for delivering material from the supply hopper to the auxiliary hopper, said self-compensating feeder means including a conveyor member reciprocally movable within the supply hopper and having a discharge end disposed to discharge material into the auxiliary hopper at a point above the material removing means but below the top of said auxiliary hopper, and control means for relatively adjusting the rate of delivery of material by the conveyor member to the auxiliary hopper and the rate of delivery of material to the material distributing means from the auxiliary hopper by said material removing means, so that the conveyor member may deliver more material to the auxiliary hopper in a given period of time than the material removing means removes therefrom, whereby the resulting accumulation of material within the auxiliary hopper about the discharge end of the conveyor member creates resistance to the discharge of material from the conveyor member and thereby reduces the rate of feed therefrom.

2. The combination recited in claim 1 wherein the conveyor member of the self-compensating feeder means comprises a feeder plate mounted in the supply hopper for reciprocation with the discharge end of the plate disposed within an opening in a wall of the auxiliary hopper, said auxiliary hopper including wall members extending above said discharge end of the feeder plate whereby accumulated material within the auxiliary hopper above the level of said plate tends to reduce the amount of material discharged by the plate into said auxiliary hopper.

3. In a distributor, a hopper for material to be distributed, a feeder disk mounted therein for rotation about a substantially vertical axis, said disk rotating in a substantially horizontal plane, the hopper including walls having portions extending upwardly from the periphery of the disk, said wall portions being provided with discharge apertures positioned to receive material projected by centrifugal force from the disk when the latter is rotated, metering means comprising adjustable plate members mounted in operative relation to said apertures to control the effective discharge area thereof and cut-off means including closure plate members slidably mounted on the hopper walls and operable independently of said adjustable plate members to open and to close said apertures in all positions of said adjustable plate members.

4. The apparatus described in claim 3 wherein said hopper is mounted on an automotive vehicle for transport thereby and wherein control means are provided at the driver's seat operatively connected to said closure plate members whereby the cut-off means may be remotely controlled.

5. The apparatus described in claim 3 wherein said adjustable plates and said closure plate members slidably mounted in superposed relation on the hopper walls with the closure plate members disposed next adjacent to the outer surface of the hopper walls.

6. In a distributor, a material receiving hopper, a feeder disk therein mounted for rotation in a horizontal plane, discharge openings in the hopper walls at the periphery of the disk and through which material may be projected centrifugally from the disk when the disk is rotated, means for controlling the rate of discharge of material from said hopper by the feeder disk and reciprocating plate feeder means for supplying material to said hopper at a point above the plane of the disk and below the top of the hopper whereby when the rate of supply of material to the hopper by said reciprocating plate feeder means exceeds the rate of discharge of material from the hopper by said feeder disk, material accumulating within the hopper and about the discharge end of the reciprocating plate feeder means will reduce the rate of feed of material by said reciprocating plate feeder means and thereby render the same self-compensating.

7. A distributor as described in claim 6, wherein a distributor disk is mounted for rotation below the feeder disk and wherein chute means are positioned to receive the material discharged through said openings by said feeder disk and deliver the same to said distributor disk.

8. In combination, an automotive vehicle, a material supply hopper body thereon, an auxiliary hopper mounted on said supply hopper body, a reciprocating plate feeder within said supply hopper body and having the discharge end thereof disposed within said auxiliary hopper, a rotatable disk feeder within said auxiliary hopper, mounted for rotation in a substantially horizontal plane, discharge openings provided in the walls of the auxiliary hopper through which material to be distributed may be projected centrifugally from said disk, the walls of said auxiliary hopper extending appreciably above the level of the discharge end of the plate feeder to thereby render the plate feeder self-compensating in respect to the accumulation of material within said auxiliary hopper.

9. The apparatus described in claim 8 wherein means are provided for reciprocating the plate feeder and rotating the disk feeder, and means under the control of the operator and positioned adjacent to the operator's driving position for operatively connecting said first means to and disconnecting the same from the power plant of the automotive vehicle.

10. The apparatus described in claim 8 wherein material metering means is provided in operative association with said discharge openings, and wherein cut-off means is provided for each such discharge openings together with means for actuating the cut-off means independently of the metering means and from a point adjacent the operator's driving position.

11. In a reciprocating plate feeder, a supply hopper having an elongated bottom opening, an elongated inverted angle member secured to the outside surface of the wall of the hopper adjacent to each longitudinal edge of said opening, an elongated plate mounted for reciprocation beneath said opening with the upper surface of the plate in juxtaposed relation to the longitudinal edges of the hopper walls which define said opening, said plate being provided with longitudinally extending flanges at the longitudinal edges thereof, said inverted angle members being disposed between said upstanding flanges.

12. In combination with a reciprocating plate feeder, a hopper having an elongated bottom opening and a plate mounted for reciprocation beneath said opening, sealing means for the joint between the hopper walls and plate comprising means secured to the outer surface of the hopper walls adjacent to the longitudinal edges thereof, said means being provided with an elongated downwardly opening groove, the wall defining said groove terminating substantially in the plane of said opening, and longitudinally extending upstanding flanges carried by the plate and disposed outwardly of said last-mentioned means, whereby material from the plate may accumulate within said groove to form a seal for the joint.

13. In an automotive vehicle, a self-unloading hopper body thereon provided with an elongated bottom opening therein disposed in a plane inclined downwardly and rearwardly of the hopper, a plate closing said opening and mounted for longitudinal reciprocation substantially in the plane of said opening, discharge opening provided in the rear wall of the hopper body through which material from the hopper is moved by said plate when the latter is reciprocated, means driven from the power plant of the vehicle for reciprocating said plate, an auxiliary hopper supported at the discharge side of and surrounding said discharge opening and including wall members extending appreciably above said discharge opening, and material discharge means for moving material from said auxiliary hopper at a rate less than the rate of delivery of material thereto by said plate, to cause accumulation of material within the auxiliary hopper to a point above said discharge opening to create resistance to the discharge of material therefrom and automatically reduce the rate of feed of material to the auxiliary hopper by said plate.

14. The apparatus described in claim 13 wherein the material discharge means of the auxiliary hopper includes control means for varying the rate of discharge of material from the auxiliary hopper whereby to vary the rate of accumulation of material within the auxiliary hopper and thereby automatically reduce correspondingly the rate of discharge of the material by the reciprocating plate into the auxiliary hopper.

References Cited in the file of this patent

UNITED STATES PATENTS

| | | |
|---|---|---|
| 664,072 | Allen | Dec. 18, 1900 |
| 1,166,477 | Parrish | Jan. 4, 1916 |
| 2,185,415 | Miles | Jan. 2, 1940 |
| 2,673,090 | Blumberg | Mar. 23, 1954 |
| 2,698,184 | Bowen | Dec. 28, 1954 |

FOREIGN PATENTS

| | | |
|---|---|---|
| 13,126 | Great Britain | 1905 |
| 683,299 | Great Britain | Nov. 26, 1952 |